GOTTLIEB KOENIG & GEORGE OTTO'S
IMPROVED POTATO DIGGER
74699
PATENTED
FEB 18 1868
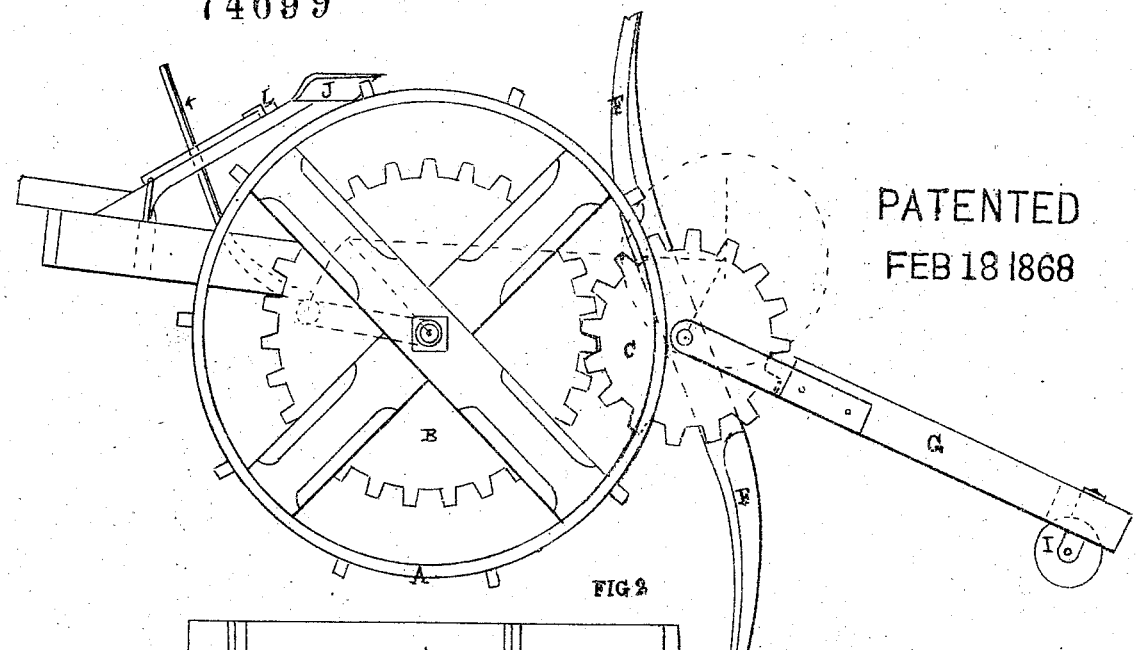
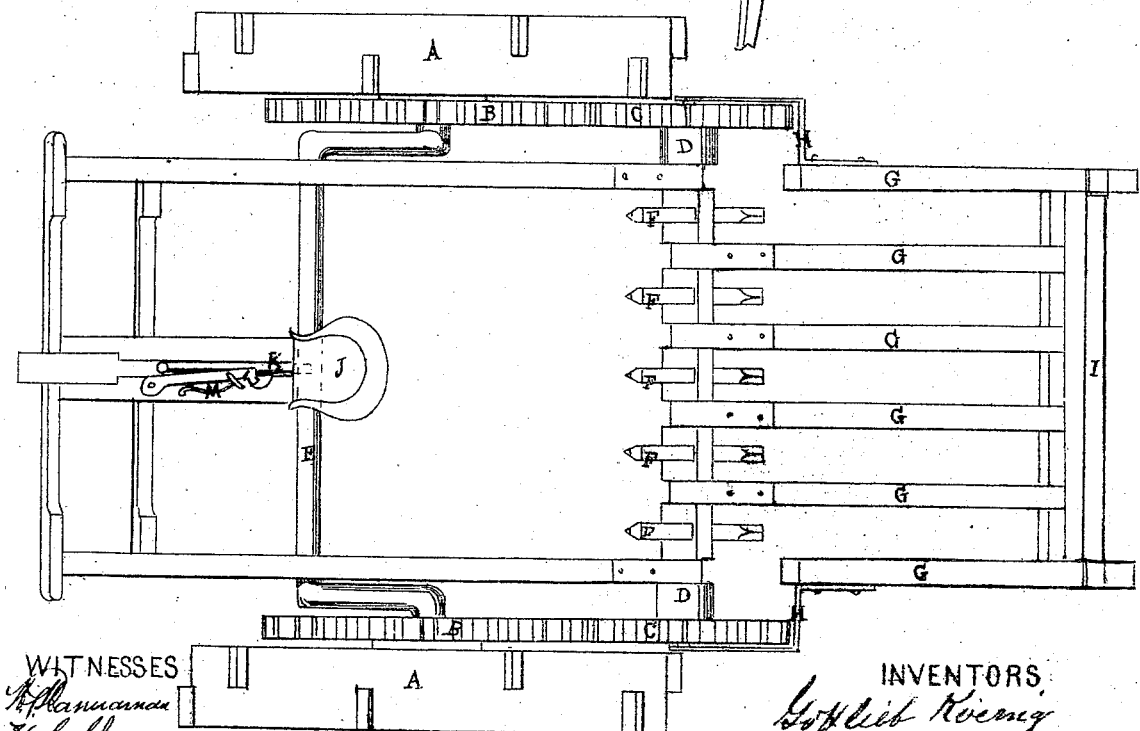
WITNESSES
INVENTORS

United States Patent Office.

GOTTLIEB KOENIG AND GEORGE OTTO, OF PLYMOUTH, MICHIGAN.

Letters Patent No. 74,699, dated February 18, 1868.

---

IMPROVEMENT IN POTATO-DIGGERS.

---

The Schedule referred to in these Letters Patent and making part of the same.

---

TO WHOM IT MAY CONCERN:

Be it known that we, GOTTLIEB KOENIG and GEORGE OTTO, of Plymouth, in the county of Wayne, and State of Michigan, have invented a new and useful Improvement in Potato-Diggers; and we do declare that the following is a true and accurate description thereof, reference being had to the accompanying drawings, and to the letters of reference marked thereon, and making a part of this specification.

Figure 1 is a side view of our invention.

Figure 2 is a top view of the same.

The same letters indicate similar parts in each figure.

Our object, in this invention, is to construct an apparatus that, while it is designed to do its work well and with speed, will be cheap in price, and brought within the means of all.

We are aware that there are many inventions designed to aid the grower in harvesting his potatoes, but the expense attending their construction is so great that but very few farmers can afford to purchase them.

In the construction of our machine, we use two traction-wheels, A A, to which are attached the gear-wheels B B, which mesh into the pinions C C, which are hung upon the shaft D. The traction-wheels A A are hung upon the crank-axle E. Upon the shaft D are placed the revolving teeth F F F F F, which are driven by the gear-wheels and pinions heretofore described. G G, &c., are a rack suspended, by the arms H H, to the shaft D. Through the openings between the bars of this rack the teeth F F, &c., pass. The rear end of this rack rests upon the roller I. J is the seat for the driver and operator, near which is the lever K, by which the operator throws the machine into or out of gear, as he may desire. When in operation, the catch L and spring M hold the lever K in place. The revolving teeth should be diamond-pointed, as shown in the drawing. The red lines in fig. 1 are intended to show the position of the gearing when thrown out of use.

What we claim as our invention, and desire to secure by Letters Patent, is—

The combination of the traction-wheels A A, the gear-wheels B B, the pinions C C, the shaft D, the crank-axle E, the revolving teeth F F F F F, the rack G, the arms H H, the roller I, the seat J, the lever K, the catch L, the spring M, with a suitable frame, when arranged substantially as and for the purpose described.

GOTTLIEB KOENIG.
GEORGE OTTO.

Witnesses:
H. S. SPRAGUE,
H. G. HANNAMAN.